United States Patent [19]

Dieterich et al.

[11] 4,103,432
[45] Aug. 1, 1978

[54] VEGETABLE DRYING APPARATUS

[76] Inventors: Frank L. Dieterich, 3727 S. Robertson Blvd., Culver City, Calif. 90230; Stanton Abrams, 3040 Greenfield Ave., Los Angeles, Calif. 90034

[21] Appl. No.: 794,556

[22] Filed: May 6, 1977

[51] Int. Cl.² ............................................. F26B 17/24
[52] U.S. Cl. ......................................... 34/58; 34/53; 34/55; 210/368; 366/274
[58] Field of Search ............... 34/53, 55, 58; 210/368, 210/512; 233/22, 21, 16

[56] References Cited

U.S. PATENT DOCUMENTS

| 2,174,018 | 9/1939 | Schaum | 210/368 X |
| 3,391,469 | 7/1968 | Reeder | 34/58 |

*Primary Examiner*—Harold W. Weakley
*Attorney, Agent, or Firm*—Fulwider, Patton, Rieber, Lee & Utecht

[57] ABSTRACT

An apparatus for drying lettuce and other vegetables including a basket in which wet lettuce is placed, a stand in which the basket is removably received, a holding mechanism that rotatably supports the basket using magnets to maintain its position, and an electric motor for rotating the basket. The sidewalls of the basket are perforated to allow water propelled by centrifugal force to escape as the basket is rotated. A removable splash shield that surrounds the basket confines the water causing it to be collected in a drip pan.

The holding mechanism is normally held against rotation by a brake. When the motor is energized, current flows through the brake to release it. As a safety feature, no power is applied to the motor and brake circuits when the device is not in operation.

14 Claims, 3 Drawing Figures

VEGETABLE DRYING APPARATUS

BACKGROUND OF THE INVENTION

The present invention relates to an apparatus for drying vegatables, particularly lettuce.

In the course of preparing vegetables it is frequently necessary to dry them before they are refrigerated or served. Cut lettuce, in particular, is customarily treated with ice water so that it will be fresh and crisp when used later in salads and should be partially dryed so that salad dressing will not run off the leaves too quickly, but some moisture should be retained to make the lettuce more palatable.

In the past, lettuce has been dryed by placing it in a perforated basket that is shaken or rotated, either manually or by an electric motor. Motorized dryers present a serious danger of electrical shock to persons operating or cleaning them, since the device and the surrounding floor area are usually wet. Previously known vegetable dryers are often difficult to clean, since they often have numerous corners and crevices that are not easily accessible. A thorough cleaning usually requires that a skilled person disassemble the device, using appropriate tools. Cleaning is, therefore, a time-consuming process that may tend to be done with less frequency than is desirable.

Motor driven dryers are usually equipped with clutches for controlling their rotation. These clutch mechanisms are of a type that can easily injure the hands of the operator and present a particularly high risk of injury when the device is being cleaned.

Another dangerous aspect of previously known vegetable dryers is the use of upstanding lugs that engage and rotate a removable basket. If the dryer is turned on after the basket is removed, the rotating lugs become a likely source of injury.

The objective of the present invention is to provide a simple, convenient, and easy to operate apparatus for drying lettuce and other vegetables that can be readily used in restaurants and other food preparation facilities. It should dry the lettuce quickly without heating or other harmful processes. In addition, it should be safe to operate, easy to clean, compact, and manufacturable at low cost.

SUMMARY OF THE INVENTION

The present invention provides a vegetable-drying apparatus that uniquely achieves the foregoing objectives. It utilizes a water permeable basket for the vegetables removably received by a stand in which it is rotatably supported. When an electric motor spins the basket at high speed, centrifugal force quickly drives the water out through the basket sidewalls, which can be made of plastic having perforations to allow the water to escape. A splash shield that forms part of the stand surrounds the basket during the drying operation, and water that runs down the shield is collected in a drip pan. Rotation can be halted by a timer after a selected interval to preserve the desired moisture content.

A ferromagnetic plate on the bottom of the basket is engaged by magnets so that the basket is securely held but readily removable for loading and unloading. Once removed, the basket can be used for storage or as a serving container.

A flywheel that stabilizes the rotation of the basket also cooperates with a brake, being engageable by a brake shoe. A spring biases the brake shoe toward a flywheel engaging position to arrest rotation of the basket, but is moved electro-magnetically against the force of the spring toward a disengaged position when the motor is energized. When the motor is de-energized and the spring causes the brake to be engaged, there is no current flowing in the brake or motor circuits. The danger of an electric shock is, therefore, minimized.

Other features and advantages of the present invention will become apparent from the following detailed description of a preferred form thereof and the attached drawing which illustrates, by way of example, the principles of the invention.

DESCRIPTION OF THE PREFERRED EMBODIMENT

Figure 1:
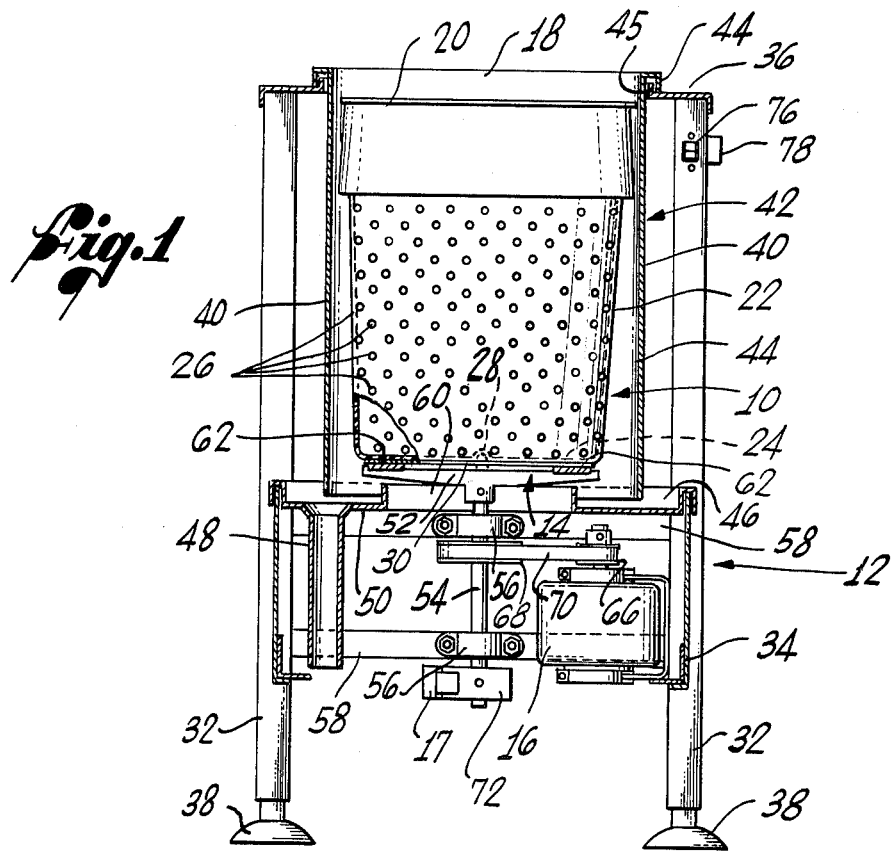
FIG. 1 is a cross-sectional view of a vegetable drying apparatus constructed in accordance with the present invention.
Figure 2:
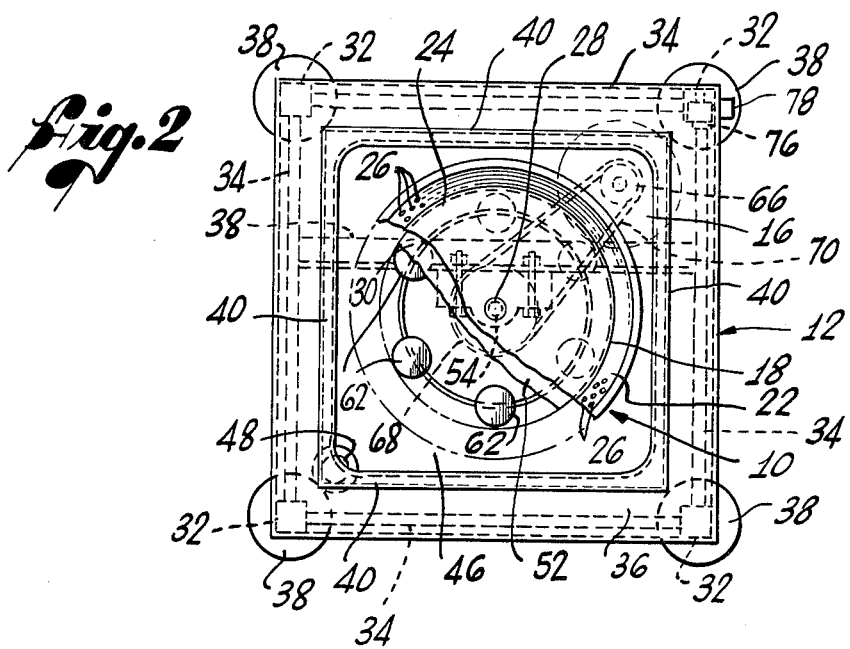
FIG. 2 is a top view of the apparatus of FIG. 1, part of the basket being broken away to expose the holding mechanism.

The novel features of the present invention are embodied in the exemplary vegetable drying apparatus, illustrated in the accompanying drawings, which in- includes a basket 10, a stand 12 in which the basket is received, a holding mechanism 14 that rotatably supports the basket, a motor 16 for rotating the holding mechanism and the basket, and a brake 17 for arresting rotation of the basket.

The basket 10 is molded of polypropylene plastic, which is easily sanitized and well recognized as suitable for use in food handling equipment. Being generally cylindrical, the basket 10 has an open top end 18 surrounded by an imperforate narrow band 20. The sidewalls 22 taper slightly inwardly from the band 20 toward a generally flat bottom 24. Small, closely-spaced holes 26 in the sidewalls 22 make them water permeable. A recess or dimple 28 projects upwardly at the center of the bottom 24 and an annular, ferromagnetic bottom metal plate 30 surrounds the recess for engagement by the holding mechanism 14, as explained below.

The stand 12 has four equally-spaced, elongated legs 32 at its corners that are connected intermediate their ends by horizontal braces 34 and at the top by an open rectangular frame 36. Suction cups 38 at the bottom ends of the legs 32 securely position the apparatus on any suitable flat surface. Four integrally formed, polypropylene plastic panels 40 extend vertically between the legs 32 to form a splash shield 42 that defines an opening 44 in which the container 10 is received. Water driven outwardly through the perforations 26 of the container 10 is thus confined by the shield 42. The corners of the shield 42 where the panels 40 meet are rounded for ease of cleaning. Alternatively, a cylindrical splash shield may be employed. To position the shield 42, a lip 44 about its outer top edge engages an upstanding flange 45 on top of the frame 36. Since the shield 42 is received by the stand 12 without any fastening device, it can be freely removed for cleaning without using tools.

A drip pan 46, made up of channel-shaped members connected end-to-end to form the sides of a square, is positioned beneath the lower edges of the shield 42 to collect the water that runs off, and a drain spout 48 in the pan floor 50 can be connected to a waste pipe or holding tank (not shown).

The holding mechanism 14 includes a disk-shaped horizontal platform 52 centrally located between the legs 32 and rotatably mounted atop a vertical drive shaft 54. Bearings 56 that position the shaft are mounted on two vertically spaced, horizontal cross-pieces 58 that extend between the braces 34. An opening 60 in the center of the platform 52 permits the top end of the shaft 54 to project slightly to engage the recess 28 and center the basket 10, but the top surface of the platform is otherwise flat to minimize the risk of injury to the operator when it rotates. A plurality of permanent magnets 62 are arranged in a circle about the outer periphery of the upper surface of the platform 52 to magnetically engage the bottom plate 30 of the basket 10, thereby securing the basket for rotation with the holding mechanism 14. The basket 10 can, however, be removed through the large center opening of the frame 36 by simply pulling it upwardly with sufficient force to disengage the magnets 62. It can then be used as a convenient container to store or serve the lettuce. If desired, the magnets 62 may be electromagnets which are energized and de-energized in timed relation to the operation of the motor 16.

The electrical motor 16 is attached to one of the legs 32 and drives the shaft 54 via two speed-reducing pulleys 66 and 68 and a V-belt 70, thereby supplying the power to rotate the basket 10. To stabilize the shaft 54 and eliminate vibrations attributable to any unbalanced loading of the basket 10, a flywheel 72 is attached to the lower end of the shaft 54 below the cross-pieces 58. The weight of the flywheel 72 should be at least equal to that of the basket 10, plus its contents. Rotation of the basket 10 can be halted by the brake 17 which is attached to one of the cross-pieces 58. The motor 16 and the brake 17 are controlled by a main switch 76 and an adjustable timer 78 in series with the main switch is mounted on one of the legs 32. When the main switch 76 is closed, the dryer is operated by simply setting the timer 78 to the number of seconds of rotation desired.

Figure 3:
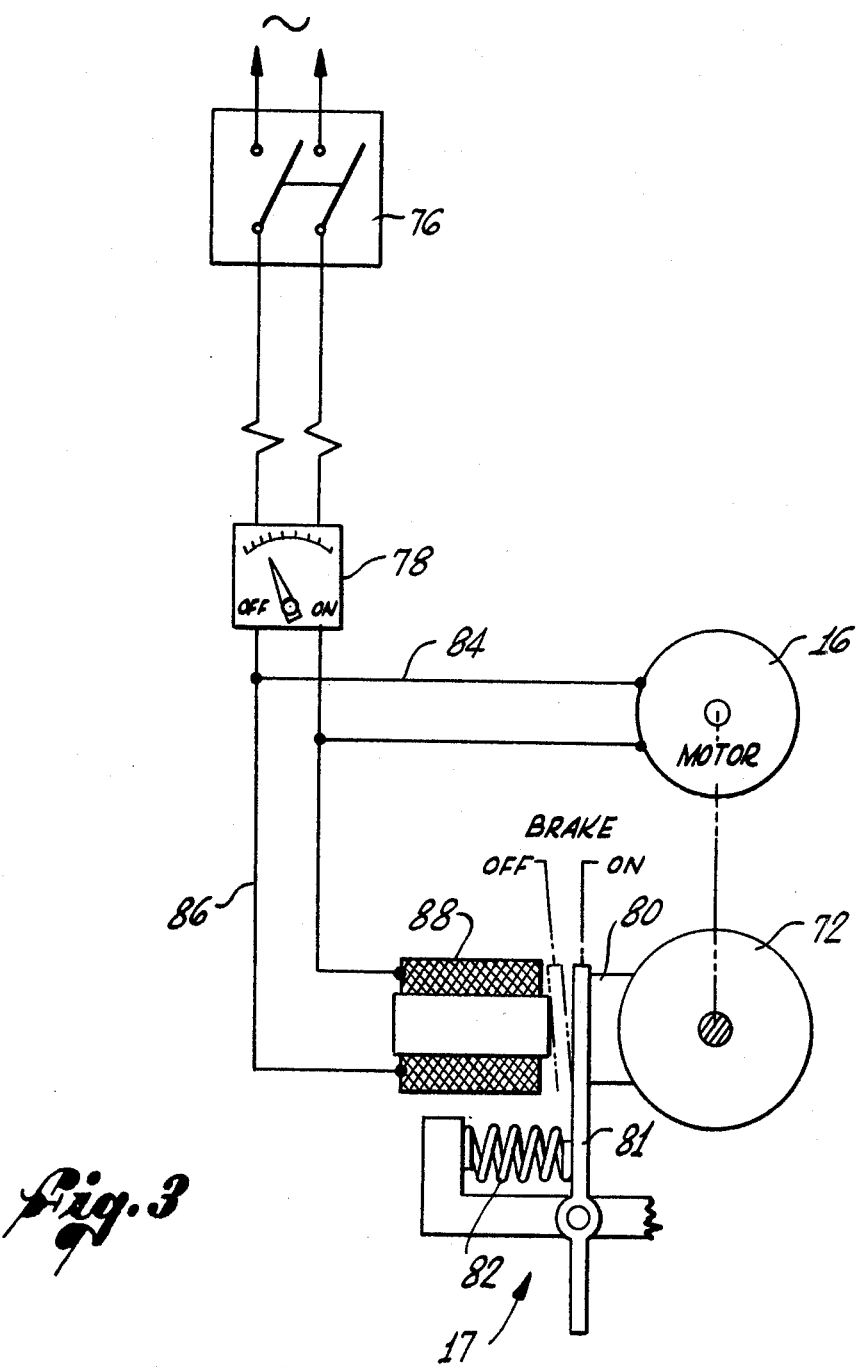
FIG. 3 is a schematic representation of the brake, motor and accompanying control circuitry.

The brake 17, as shown in FIG. 3, includes a brake shoe 80 attached to the end of a pivotable arm 81 and biased by a brake spring 82 against the circumferential outer edge of the flywheel 72. Frictional engagement of the brake shoe 80 with the flywheel 72 restrains the holding mechanism 14 against rotation. Accordingly the flywheel 72 performs the double function of stabilizing the rotation of the basket 10 and interacting with the brake shoe 80 to arrest rotation of the basket. This use of one component to perform two functions reduces the size, weight, cost and complexity of the dryer.

When a current is supplied through the main switch 76 and the timer 78 to the motor circuit 84, it is simultaneously supplied to a parallel brake circuit 86 to energize a coil 88 which electro-magnetically attracts the brake shoe 80 away from the flywheel 72, thereby releasing the shaft 54 and holding mechanism 14 for rotation.

It should be noted that when the dryer is not in operation, no current passes beyond the timer 78, even though the brake 17 is applied, and the danger of electrical shock to persons loading or unloading the device is greatly reduced or eliminated despite the typically wet environment in which it is used. The main switch 76 can be opened to further reduce the danger of shock when, for instance, the dryer is being cleaned, to prevent current from passing to the timer 78.

The optimum speed of rotation and drying time can vary from a matter of seconds to a few minutes, depending upon such factors as the size of the basket 10, the moisture content of the lettuce, and the degree of drying desired. By way of example, good results have been achieved by rotating a twenty-inch diameter basket for 45 seconds at a speed of 600 r.p.m. The relatively short processing time permits lettuce removed from cold storage to be dryed before its temperature rises objectionably.

It will be apparent from the foregoing that the invention provides a safe, convenient, and easily sanitized apparatus for quickly drying lettuce and other vegetables. It should be highly desirable for restaurant use. While a particular form of the invention has been illustrated and described, it will be apparent that various modifications can be made without departing from the spirit and scope of the invention.

We claim:

1. An apparatus for drying vegetables comprising;
   a basket having water permeable sidewalls for holding the vegetables to be dried;
   holding means for rotatably supporting said basket;
   means for magnetically attaching said basket to said holding means for rotation therewith;
   electric motor means for rotating said basket, whereby water is driven from said vegetables and through said sidewalls by centrifugal force as said basket is rotated; and
   brake means for arresting rotation of said basket including a spring biasing said brake means toward a basket-arresting position and electro-magnetic means for moving said brake means against the bias of said spring when energized.

2. The apparatus of claim 1, wherein at least a portion of the bottom of said basket is feromagnetic and said holding means includes at least one magnet arranged to releasably engage said bottom.

3. The apparatus of claim 1, wherein said basket has perforated plastic sidewalls, and the bottom thereof is at least partially ferromagnetic, said holding means including a plurality of magnets arranged to magnetically engage said bottom.

4. The apparatus of claim 1 further comprising circuit means for simultaneously energizing and de-energizing said motor means and said brake means.

5. The apparatus of claim 1 further comprising a flywheel connected to said holding means to stabilize the rotational motion of said basket.

6. The apparatus of claim 5, wherein said flywheel is engageable by said brake means.

7. The apparatus of claim 1 further comprising a freely removable splash shield surrounding said basket when said basket is supported by said holding means.

8. An apparatus for drying vegetables comprising:
   a basket for holding vegetables to be dryed, said basket being generally cylindrical, having an open top, water permeable sidewalls, and a bottom that is at least partially ferromagnetic;
   a stand including a freely removable splash shield defining the sides of an opening in which said basket is insertable;
   means attached to said stand for rotatably holding said basket within said opening, said holding means including at least one magnet arranged to magnetically engage said bottom;
   electric motor means for rotating said holding means and thereby rotating said basket, whereby water is driven from said vegetables and through said sidewalls by centrifugal force as said basket is rotated;

electro-magnetic brakes means for arresting rotation of said holding means when in a de-energized condition and for permitting rotation of said holding means when in an energized condition; and circuit means for simultaneously energizing said motor means and said brake means.

9. The apparatus of claim 8, wherein said circuit means includes a main switch and a timer connected in series.

10. The apparatus of claim 8 further comprising a flywheel connected to said holding means and engaged by said brake means.

11. An apparatus for drying vegetables comprising:

a basket for holding vegetables to be dryed, said basket being generally cylindrical and having perforated plastic sidewalls, an open top and a ferromagnetic metal bottom plate;

a stand including a freely removable plastic splash shield defining an opening in which said basket is receivable, a drip pan beneath said splash shield to collect water removed from said vegetables, and a drain spout connected to said drip pan;

holding means including a platform rotatably attached to said stand for supporting said basket within said opening, and a plurality of magnets arranged to releasably engage said bottom plate;

a flywheel attached to said holding means for rotation therewith;

electric motor means for rotating said holding means and thereby rotating said basket, whereby water is driven from said vegetables and through said perforated sidewalls by centrifugal force upon rotation of said basket;

electro-magnetic brake means for arresting rotation of said holding means by engaging said flywheel when in a de-energized condition and for permitting rotation of said holding means when in an energized condition; and circuit means for simultaneously energizing said motor means and said brake means.

12. The apparatus of claim 11, wherein said magnets are permanent magnets.

13. The apparatus of claim 11, wherein said holding means further includes a vertical shaft projecting above the top surface of said platform, and said basket has a recess in its bottom surface in which the projecting end of said shaft is received, said top surface being flat except for said projecting shaft.

14. The apparatus of claim 11, wherein said magnets are electro-magnets.

* * * * *